United States Patent [19]

Özdemir

[11] Patent Number: 4,598,845
[45] Date of Patent: Jul. 8, 1986

[54] DOSING APPARATUS FOR DISPENSING PREDETERMINED QUANTITIES PREFERABLY OF BEVERAGES FROM A BOTTLE

[76] Inventor: Nazmi Ozdemir, 25 Abelogade, 3 tv., 2100 Copenhagen Ø, Denmark

[21] Appl. No.: 629,540
[22] PCT Filed: Nov. 4, 1983
[86] PCT No.: PCT/DK83/00105
  § 371 Date: Jul. 10, 1984
  § 102(e) Date: Jul. 10, 1984
[87] PCT Pub. No.: WO84/01937
  PCT Pub. Date: May 24, 1984

[30] Foreign Application Priority Data
  Nov. 11, 1982 [DK] Denmark .......................... 5018/82
  Apr. 5, 1983 [DK] Denmark .......................... 1504/83

[51] Int. Cl.⁴ ............................................. G01F 11/28
[52] U.S. Cl. .................................. 222/449; 222/447;
  222/504; 251/129.21
[58] Field of Search ............... 222/449, 450, 445, 446,
  222/447, 504, 453, 362, 363, 361; 251/139, 141,
  130, 211

[56] References Cited
U.S. PATENT DOCUMENTS

| 2,314,384 | 3/1943 | Berwick et al. | 222/449 |
| 3,243,086 | 3/1966 | Dousette | 222/447 |
| 3,666,144 | 5/1972 | Winder | 222/504 |
| 4,378,079 | 3/1983 | Kuckens | 222/504 |

FOREIGN PATENT DOCUMENTS

| 2223310 | 11/1972 | Fed. Rep. of Germany ...... 222/447 |
| 2548442 | 5/1977 | Fed. Rep. of Germany . |
| 91455 | 3/1936 | Sweden . |

Primary Examiner—Joseph J. Rolla
Assistant Examiner—Kenneth Noland
Attorney, Agent, or Firm—Cushman, Darby & Cushman

[57] ABSTRACT

A dosing apparatus for dispensing predetermined quantities preferably of beverages from a bottle or a similar object is constructed to be fastened at the orifice of the bottle and comprises an inlet opening (11) and an outlet opening (13) as well as a magnetically operated first valve device (15), which by activation enables the beverage to flow from the dosing apparatus through the outlet opening (13). The apparatus further comprises an air valve (54) for equalizing the pressure. The apparatus has a total cavity corresponding to the desired dosage quantity and further comprises a second valve device (49) adapted to turn off the outflow of beverage from the bottle to the dosing apparatus, while the first valve device (15) is open to outflow. Besides the apparatus has devices (44, 45, 27, 46) ensuring a forced closing of the second valve device (49) before the first valve device is opened, and an automatic opening of the second valve device (49) when the first valve device has been closed. The dosing apparatus makes it possible to dispense correct predetermined quantities of beverages independent of the viscosity of the beverage in question.

5 Claims, 4 Drawing Figures

DOSING APPARATUS FOR DISPENSING PREDETERMINED QUANTITIES PREFERABLY OF BEVERAGES FROM A BOTTLE

TECHNICAL FIELD

The invention relates to a dosing apparatus for dispensing predetermined quantities preferably of beverages from a bottle or a similar object, said dosing apparatus being adapted to be fastened at the orifice of the bottle and comprising an inlet opening, an outlet opening as well as a magnetically operated first valve device, which by activation enables the beverage to flow from the dosing apparatus through the outlet opening, and said apparatus having an air valve for equalizing pressure in the inner of the bottle during outflow.

BACKGROUND ART

Dosing apparatuses are known having a valve device which, when activated by an electromagnet, preferably disposed in a ring through which the dosing apparatus is placed at the dispensing, is opened for a predetermined period of time, so that the beverage is allowed to flow out of the bottle with the dosing apparatus through said dosing apparatus, until the valve device is closed again. These known dosing apparatuses which thus deliver a predetermined quantity of beverages determined by the opening time of the valve device claim an exact adjustment of time dependent on the viscosity of the beverage in question.

DISCLOSURE OF INVENTION

The dosing apparatus according to the invention is characterised in that the apparatus comprises a total cavity corresponding to the desired dosage quantity, and in that the apparatus comprises a second valve device adapted to turn off the outflow of beverage from the bottle to the dosing apparatus, while the first valve device is open to outflow, in that the apparatus comprises means ensuring a forced closing of the second valve device before the first valve device is opened, and an automatic opening of the second valve device, when the first valve device has been closed.

A dosing apparatus is hereby provided which permits dispensing of predetermined quantities of beverages independent of a specific time interval, as there will never flow more liquid out of the dosing apparatus than is present in its inner cavity. This is especially due to the fact that because of the second valve device the dosing apparatus permits no liquid to flow out of the bottle as long as the dispensing takes place, i.e. as long as the first valve device is open. Of course, the quantity dispensed corresponds to the size of the cavity, which may be adjusted by means of adjustment parts capable of being screwed in. Due to the fact that the second valve device is also in closed position, while the first valve device is open, the dosing apparatus may if desired be connected with a locking arrangement securing that a bottle placed through a fixed, annular actuation device cannot be removed before the locking arrangement is released after a predetermined time interval. The user is hereby prevented from interrupting the dispensing before it is ended by raising the bottle in advance. By leaving the first valve device open for a comparatively long time it is ensured that the customer will always get the quantity of beverage corresponding to the volume of the dosing apparatus irrespective of the beverage being of low or of high viscosity.

In an especially advantageous embodiment the first and the second valve device may each comprise a loose, separate valve body, adapted to cooperate with the outlet opening and the inlet opening, respectively, so that the opening in question is closed tightly, when the valve device in question is in closed position.

Furthermore according to the invention the magnetical activation of the first valve device may be ensured by means of a separate, magnetically activable displacement body constructed to be moved forwards and backwards in a predetermined path within the dosing apparatus in such a way that by activation it is displaced in one direction of the path and hereby pulls the first, loose valve body away from its closed position, substantially immediately after the second valve body has been brought into closed position. It is hereby made possible to construct a displacement body which is comparatively big and thus so strong that the life time of the valve bodies is relatively long in spite of the depositing of sugar from comparatively sweet beverages.

According to the invention the two valve bodies may be solids of revolution substantially coaxially embedded within the cavity of the dosing apparatus, and the displacement body may comprise a cylindrical part substantially coaxially disposed round the two valve bodies and constructed to cooperate with said bodies by means of radially inwardly projecting parts. An especially simple manufacture of the dosing apparatus is hereby obtained.

According to the invention the radially inwardly projecting parts of the displacement body may be formed by a separate, annular connection member snapped in a circumferential recess or groove in the inner surface of the cylindrical part, said annular connection member having radial, inwardly extending branches connected with an inner, annular abutment portion snapped to the first valve body, whereby an easy assembling of the dosing apparatus is obtained.

Furthermore, according to the invention the radially inwardly projecting parts of the displacement body may be axially, displaceably mounted on the first valve body, and the first valve body may comprise a radial abutment collar, by means of which the first valve body is pulled away from the closed position while cooperating with the radial parts of the displacement body, and the first valve body may be actuated in the direction of its closed position by means of a biased spring, whereby the first valve body with an associated displacement body functions in an especially simple manner and is easy to manufacture.

Besides according to the invention the second valve body may in its closed position be actuated by a spring simultaneously interconnecting the displacement body and the second valve body, whereby the functioning of the valve body is ensured in a very simple manner.

In addition the air valve of the dosing apparatus may be located in connection with a passage through the wall of the apparatus and is adapted to cooperate with the valve devices in such a manner that an opening is automatically provided for passage of air to the inner cavity of the apparatus, when the first valve device is open. An equilizing of pressure in the inner of the dosing apparatus during the dispensing, and subsequently in the bottle in question during the filling of the dosing apparatus is hereby obtained in a very simple manner, as the air in the latter case flows from the dosing apparatus and into the bottle. Finally, according to the invention the air valve may be actuated directly by the cylindrical displacement body.

BRIEF DESCRIPTION OF THE DRAWING

The invention will be described below with reference to the accompanying drawing, in which.

BEST MODE FOR CARRYING OUT THE INVENTION

Figure 1:
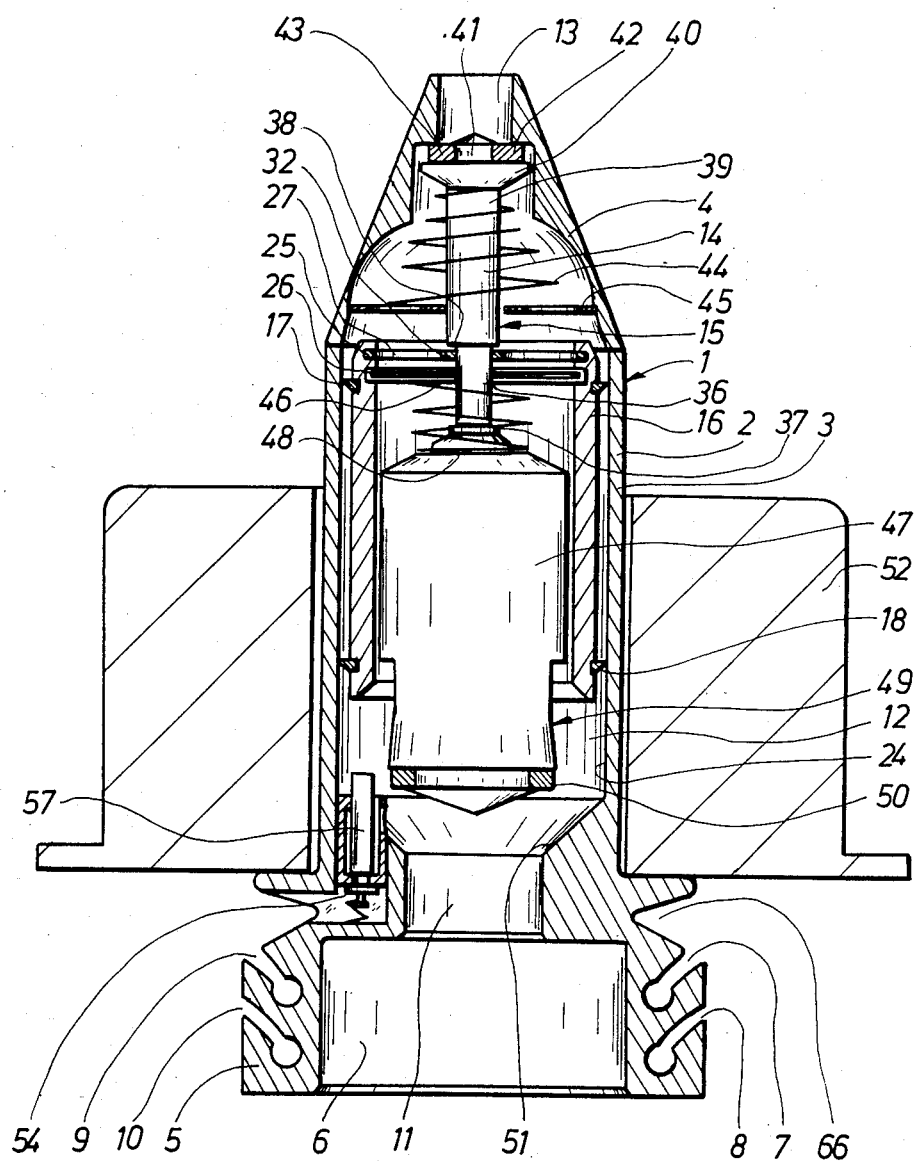
FIG. 1 is an axial sectional view through a preferred embodiment of the dosing apparatus according to the invention disposed in a schematically shown electromagnetic device having the form of a ring.

In FIG. 1 a dosing apparatus is shown provided with the general reference number 1. This apparatus comprises a housing 2 composed of two parts 3, and 4, which may be assembled in any known way, e.g. by ultrasonic welding. In one end the housing 2 forms a mounting portion 5 surrounding a receiving aperture 6 adapted to receive the orifice of a bottle (not shown) or a similar device containing preferably a beverage. The mounting portion 5 is provided with slits 7, 8, 9, and 10, by means of which the dosing apparatus may be fastened on the bottle in question in a manner not shown, e.g. by means of a sealing device. Said mounting slits 7–10 may of course be constructed in many different ways and be of many different shapes.

Figure 3:
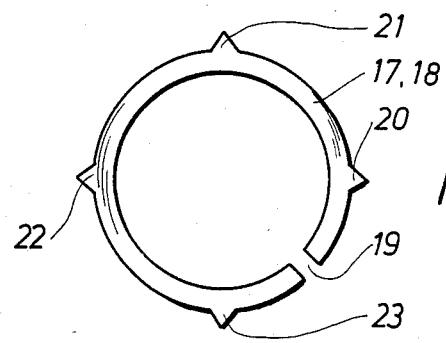
FIG. 3 is a top view of a guide ring to be located on the outside of the displacement body.

Coaxially with the receiving aperture 6 an inlet opening 11 extends which from the receiving aperture 6 leads into the inner cavity 12 of the dosing apparatus; said cavity extends through the entire housing 2 to an outlet opening 13 extending axially out through the front end of the housing opposite the receiving aperture 6. Within the front end of the housing a first valve body 14 is disposed forming part of a first valve device provided with the general reference number 15. Said first valve device 15 also comprises a cylindrical displacement body 16 made of a magnetically activable material. Said cylindrical displacement body 16 is displaceably mounted in a cylindrical part of the housing 2 within the cavity 12. During its displacement the displacement body is guided by means of circumferential guide rings 17, 18, shown most clearly in FIG. 3. These guide rings are each adapted to be received in a circumferential groove in the outer wall of the cylindrical displacement body and are provided with a slit 19 permitting mounting of the guide rings by snap action. The rings are further shaped in such a manner that they comprise radially extending projections 20, 21, 22, and 23 located at a suitable mutual angular distance round the periphery of the ring. Besides the guide rings 17, 18 are of such dimensions that substantially only these projections 20–23 extend beyond the wall of the cylindrical body, and the projections moreover have such an extension, that by cooperation with the inner cylindrical wall 24 of the housing 2 they guide the cylindrical displacement body 16 in a substantially coaxial path relative to the housing.

Figure 2:
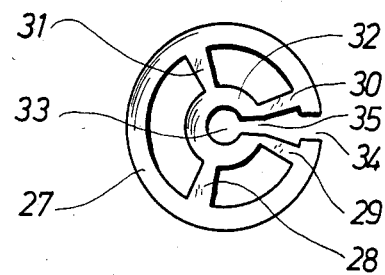
FIG. 2 is a top view of a disc-shaped means connecting the first valve device of the dosing apparatus with a displacement body.

Internally the displacement body 16 comprises two circumferential grooves 25, 26, of which the first one 25 is closest to the end, which is foremost in the mounting state, of the displacement body 16 and is adapted to be received by an annular connection member 27 with radially inwardly projecting parts, by means of which the cylindrical body 16 is connected with the first valve body 14 in a manner described more explicityly below. The annular connection member 27, more clearly shown in FIG. 2, has radially inwardly extending branches 28, 29, 30, 31 connected with an inner annular abutment portion 32 which defines an opening 33 for receiving the first valve body. As it appears from FIG. 2 the annular connection member 27 as well as the annular abutment portion 32 comprise a slit 34 and 35, respectively, permitting the connection member to be snapped in the displacement body 16 as well as the first valve body 14 to be snapped in the opening 33, the connection member being made of a suitably firm material.

The inner opening 33 of the connection member 27 is adapted to cooperate with a shaft part 36 on the first valve body. Said shaft part has a circular cross-section dimensioned together with the inner opening 33 of the connection member 27 in such a manner that said two parts can be displaced axially relative to each other. The displacement of the shaft part 36 relative to the bearing portion 32 of the connection member 27 is at the back limited by a radially, protruding circumferential abutment collar 37 and at the front by a radially extending shoulder surface 38. From said shoulder surface 38 the first valve body forms an annular rod portion 39 extending to a head 40, which in a circumferential groove 41 carries a sealing means 42 for cooperation with a circumferential, substantially radially extending valve seat 43 on the inner side of the housing 2 and adjacent to the outlet opening 13.

The first valve body 14 is pressed into its closed position, in which the sealing means 42 abuts the valve seat 43, by means of a schematically shown biased spring 44 functioning between the head of the valve body 14 and a support disc 45 fastened to the inner side of the housing. Said support disc may be of many different shapes, e.g. a shape corresponding to the connection member 27 so that it may partly be snapped in the inner of the housing and partly be snapped round the rod portion 39 of the valve body 14. Simultaneously the support disc 45 contribute to the guidance of the first valve body 14 during its axial displacement.

The shaft part 36 of the first valve body 14 is placed relative to the remaining parts of said first valve body 14 in such a way that the displacement body 16 with the attached connection member 27 is at the end of the shaft part 36 closest to the shoulder surface 38 when the first valve body 14 is in closed position, and the displacement body is in its inactivated position, i.e. displaced as far ahead as possible relative to the inner cylindrical wall 24 of the housing 2.

The said second internal circumferential groove 26 of the displacement body 16 is adapted to fasten one end of a spiral spring 46, the other end of which is connected with a second valve body 47 displaceably born within the back end of the displacement body 16 in the mounting position. The spring 46 is connected with the second valve body in a circumferential groove 48.

The second valve body 47 forms part of a second valve device provided with the general reference number 49 and adapted to close the inlet opening 11 by means of a circumferential sealing means 50 when pressing the sealing means 50 towards a valve seat 51 on the inner side of the housing.

Like the first valve body 14 the second valve body 47 is shaped as a solid of revolution and is coaxial with the first valve body 14 as well as with the cylindrical displacement body 16 and moreover with the inner cavity 12 of the housing. In the position shown in FIG. 1 the second valve body 47 abuts the rear circumferential collar 37 of the first valve body 14, but by displacing the displacement body 16 the second valve body 47 is pushed away from the first valve body 14 and down to cooperate with the valve seat 51.

Said springs 44 and 46—which actuate the first valve body 14 and the second valve body 47, respectively, and the cooperating parts of the first valve body 14 and the second valve body 47 as well as the displacement body 16—are formed in such a way that the first valve body 14 remains in closed position until the second valve body 47 has been pushed into its closed position during the movement of the displacement body 16 in axial direction down towards the inlet opening 11. The shaft part 36 of the first valve body 14 consequently has such an axial extension that the abutment portion 32 of the connection member 27 does not engage the collar part 37 before the second valve body 47 has reached its closed position during the axial movement of the displacement body 16 down towards the inlet opening 11.

The forwards and backwards movement of the cylindrical displacement body 16 in the inner cavity 12 of the housing 2 is effected by means of an electromagnetic activation ring 52 of a well-known type, for which reason it is only indicated schematically in the drawing.

Figure 4:
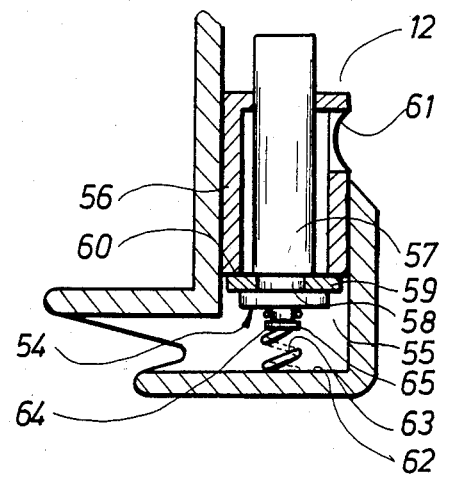
FIG. 4 illustrates on a larger scale part of FIG. 1, and more explicitly an air valve.

In the bottom end of the housing 2 an air valve provided with the general reference number 54 is disposed in the wall of said housing. Said air valve, shown on a larger scale in FIG. 4, is located in a passage 55 extending through the wall of the housing 2. The air valve (54) comprises a cylindrical valve housing 56 with an external cross-section corresponding to the internal cross-section of the passage 55, so that it may be maintained and received in said passage by a press fit. The valve housing 56 contains a displaceable valve body 57 having a circular cross-section. In the end opposite the cavity 12 said valve body has a circumferential groove 58, in which a sealing ring 59 is located adapted to cooperate with an adjacent valve seat 60 formed on the valve housing 56 in such a way that by abutment against said housing the seat turns off the passage of air through the passage 55 and the inner cavity of the housing 56; through an opening 61 said cavity is connected to the inner cavity 12 of the dosing apparatus. Between an abutment surface 62 in the passage 55 and the valve body 57 a spiral spring 63 is disposed extending coaxially with the valve body 57 and being adapted to impart a preload to said body into its closed position. The spring 63 is secured to an axially protruding pin 64 having a circumferential flange 65 on the valve body 57.

The air valve 54 is located and dimensioned in such a way that during its opening movement, i.e. when the first valve body 14 is brought into open position and the second valve body 47 into closed position, the displacement body 16 presses the valve body 57 of the air valve 54 out of engagement with its valve seat 60, so that while the first valve body 14 is in open position the flow of air through the air valve 54 is made possible. Consequently, the valve body 57 of the air valve 54 extends in axial direction through the end of the housing 56 opposite the valve seat 60 in order to engage the displacement body 16 during its activation.

Apart from the springs and the displacement body 16 the parts of the dosing apparatus may be made of suitable plastic materials, preferably by spray welding. The inner cavity 12 has such a dimension that when the parts hereof are present it may hold a beverage in a quantity corresponding to a predetermined measure; said quantity may be adjusted by adapting the outer shapes of the valve bodies and by screwing in an adjustment part from the outside, e.g. in the front end of the dosing apparatus.

In use the dosing apparatus is secured to an open bottle, the orifice of which is received in the receiving aperture 6. If desired the securing may as mentioned be effected by means of a sealing device securing that the dosing apparatus cannot be moved from the bottle without it be noticed. When it is desired to dispense a beverage in the desired quantity, the bottle is turned upside down whereby liquid flows from the bottle into the inner cavity 12 of the dosing apparatus through the inlet opening 11 until the cavity is full. The dosing apparatus is then led through an activation ring 52 activated in a well-known manner so that the displacement body 16 is actuated by an electromagnetic force, and as a result the displacement body 16 is displaced axially in a direction away from the position shown in FIG. 1 down towards the inlet opening 11 of the dosing apparatus. In this connection the second valve body 47 is first brought into the position, in which it closes the inlet opening 11, and then the first valve body 14 is pulled out of engagement with its seat 43 and opens the outlet opening 13. During the continued movement of the displacement body 16 down towards the inlet opening 11, its bottom end (seen in relation to FIG. 1) engages the valve body 57 of the air valve 54 and thus turns on the inflow of air through the air valve 54. Hereafter the quantity in question of the beverage may flow out through the outlet opening 13 until the dosing apparatus is completely empty. In this connection the air valve 54 equalizes the pressure in the cavity 12. The activation ring 52 is adjusted to actuate the displacement body 16 into open position, i.e. the lowermost position possible seen in relation to FIG. 1, until the cavity 12 has with certainty been emptied completely. Hereafter the activation of the valve body is interrupted, so that the displacement body 16 is capable of returning to the initial position shown in FIG. 1. During this movement, which if desired may be supported by an additional spring means, not shown, the first valve body 14 is first led into its closed position by means of the spring 44, and not until then does the second valve body 47 disengage its valve seat 51, so that the inflow of beverage from the bottle to the dosing apparatus is again made possible. The air valve 54 automatically turns off the inflow of air by means of the spring 63. Hereafter beverages may again flow into the inner of the dosing apparatus, and when it is filled, the dispensing process may take place again. The activation ring 52 may in a well-known manner be connected with a cash register and thus register the dispensing in question. The activation ring may be associated with a reader, and the dosing apparatus may be provided with a code, e.g. a dash code (not shown). It is hereby made possible simultaneously with the registration of the dispensing in question also to register the type of the beverage.

The activation ring 52 may be loosely connected with the cash register by suitable wires. The activation ring may, however, also be a fixed ring, which if desired may be connected to a locking arrangement (not shown), which simultaneously with the activation of the activation ring 52 locks the dosing apparatus 1 with associated bottle, e.g. by engaging a recess 66 in connection with the mounting portion 5 of the housing. It is hereby ensured that the user does not remove the dosing apparatus 1 with associated bottle from the activation ring 52 before the dispensing is completely terminated.

The invention has been described with reference to a preferred embodiment. Many variations may be made without thereby deviating from the scope of the invention. The second valve body 57 may e.g. be constructed with longitudinal grooves or recesses in the outer surface in order to secure that the beverage more easily passes this body and the displacement body 16.

I claim:

1. A dosing apparatus for dispensing predetermined quantities of liquid from a bottle or the like, said apparatus having an internal cavity corresponding to the predetermined dosage quantity, a front end provided with a liquid outlet opening and a rear end provided with a liquid inlet opening which is adapted to be fastened at the orifice of the bottle, said apparatus comprising: a first valve device for cooperating with the outlet opening to thereby control the flow of liquid through the outlet opening, said first valve device including a loose valve body shaped as a solid of revolution and located substantially coaxially within the internal cavity for movement between open and closed positions with respect to the outlet opening; a second valve device for cooperating with the inlet opening to thereby control the flow of liquid from the bottle through the inlet opening when the first valve device is open to flow of liquid through the outlet opening, said second valve device including a loose valve body shaped as a solid of revolution and located substantially coaxially within the internal cavity for movement between open and closed positions with respect to the inlet opening; and means for closing the second valve device before the first valve device is opened and for automatically opening the second valve device when the first valve device has been closed, said means including a magnetically activatable displacement body movable forwardly and rearwardly within the internal cavity in such a way that upon magnetic activation the displacement body moves in a direction to pull the first valve body away from its closed position substantially immediately after the second valve body has been brought to its closed position, the displacement body including an annular part substantially coaxially disposed around the first and second valve bodies and cooperating with such valve bodies by means of radially upwardly projecting parts which are formed by a separate annular connection member snapped into a circumferential recess in the inner surface of the annular part of the displacement body, the annular connection member having radial, inwardly extending branches connected with an inner annular abutment portion snapped into the first valve body; and an air valve for equalizing the pressure in the bottle during outflow of liquid.

2. A dosing apparatus according to claim 1, characterised in that the radially inwardly projecting parts of the displacement body are axially, displaceably mounted on the first valve body, that the first valve body comprises a radial abutment collar by means of which the first valve body is pulled away from the closed position while cooperating with the radial parts of the displacement body, and in that the first valve body is actuated in the direction of its closed position by means of a biased spring.

3. A dosing apparatus according to claim 1, characterised in that in its closed position the second valve body is actuated by a spring simultaneously interconnecting the displacement body and the second valve body.

4. A dosing apparatus according to claim 1, characterised in that the air valve is located in connection with a passage through the wall of the apparatus and is adapted to cooperate with the valve devices in such a manner that an opening is automatically provided for passage of air to the inner cavity of the apparatus, when the first valve device is open.

5. A dosing apparatus according to claim 4, characterised in that the air valve is actuated directly by the cylindrical displacement body.

* * * * *